Fig. 1.

(No Model.) 8 Sheets—Sheet 2.
E. & H. C. STOCKWELL.
AUTOMATIC BOLT OPERATING MECHANISM FOR SAFE DOORS.
No. 454,595. Patented June 23, 1891.

Fig. 2.

Witnesses
L. F. Jalihn.
C. P. Elwell.

Inventors.
Emory Stockwell.
H. C. Stockwell.
By Hopkins & Attins
Attorneys (No Model.) 8 Sheets—Sheet 3.

E. & H. C. STOCKWELL.
AUTOMATIC BOLT OPERATING MECHANISM FOR SAFE DOORS.

No. 454,595. Patented June 23, 1891.

Fig. 3.

Witnesses
L. G. Julihn.
C. P. Elwell.

Inventors
Emory Stockwell.
H. C. Stockwell.
By Hopkins & ———
Attorneys (No Model.) 8 Sheets—Sheet 5.
E. & H. C. STOCKWELL.
AUTOMATIC BOLT OPERATING MECHANISM FOR SAFE DOORS.
No. 454,595. Patented June 23, 1891.

Fig. 5.

(No Model.) 8 Sheets—Sheet 6.
E. & H. C. STOCKWELL.
AUTOMATIC BOLT OPERATING MECHANISM FOR SAFE DOORS.
No. 454,595. Patented June 23, 1891.

Witnesses
Inventors
Emory Stockwell.
H. C. Stockwell.
By Hopkins & Atkins
Attorneys (No Model.) 8 Sheets—Sheet 7.

E. & H. C. STOCKWELL.
AUTOMATIC BOLT OPERATING MECHANISM FOR SAFE DOORS.

No. 454,595. Patented June 23, 1891.

Witnesses
T. Julihn.
C. P. Elwell.

Inventors
Emory Stockwell.
H. C. Stockwell.
By Hopkins & Peckham
Attorneys (No Model.) 8 Sheets—Sheet 8.
E. & H. C. STOCKWELL.
AUTOMATIC BOLT OPERATING MECHANISM FOR SAFE DOORS.
No. 454,595. Patented June 23, 1891.

Witnesses
Louis G. Julihn.
C. P. Elwell.

Inventors
Emory Stockwell.
H. C. Stockwell.
By Hopkins & Atkins
Attorneys

UNITED STATES PATENT OFFICE.

EMORY STOCKWELL AND HERBERT C. STOCKWELL, OF STAMFORD, CONNECTICUT, ASSIGNORS TO THE YALE & TOWNE MANUFACTURING COMPANY, OF SAME PLACE.

AUTOMATIC BOLT-OPERATING MECHANISM FOR SAFE-DOORS.

SPECIFICATION forming part of Letters Patent No. 454,595, dated June 23, 1891.

Application filed March 7, 1891. Serial No. 384,137. (No model.)

*To all whom it may concern:*

Be it known that we, EMORY STOCKWELL and HERBERT C. STOCKWELL, of Stamford, county of Fairfield, and State of Connecticut, have invented certain new and useful Improvements in Automatic Bolt-Operating Mechanism for Safe or Vault Doors, of which the following is a specification, reference being had to the accompanying drawings.

The object of our invention is to provide means whereby certainty of operation of any automatic devices for casting and retracting the bolt-work of safe or vault doors is insured; and it relates to improvements for tripping bolt-operating mechanism with absolute certainty. We provide improved connections between the bolt-operating device and the bolt-work, which will reduce the liability of any failure in the connection between the operating power and the bolt-work, and which, moreover, will be operative even if part of said connections should fail.

So far as relates to the tripping device, our invention consists, broadly, in providing an independent plate or carrier that is controlled by the time-lock or other similar mechanism, and which plate itself carries the hooks or connections for the different operating powers, whether they be two or more, the result being that when this plate or carrier is released by the time-lock the whole series of locking mechanisms must be instantly simultaneously released.

With reference to the bolt-operating connections it consists in providing means for increasing the number of them between the operating devices and the bolt-work, and is valuable with either a single or double operating device.

On account of the great strength of modern safes, and consequently the difficulty of opening them in case of a lockout through any accident to the mechanism, it is very essential that every precaution should be taken against such lockout. For this reason in certain classes of bolt-operating mechanism the mechanism for operating the bolts has been duplicated. We have now carried this principle further, and not only use duplicate mechanism for operating the bolts, but make a double or multiple connection between the bolt-work and each set of springs. Further than this, we make a duplicate connection between the operating power and each section of the bolt-work.

Heretofore the different sections of the bolt-work have been connected; but all have been operated from one point, and the connections have all been single. Even when operated by a spindle there have been numerous instances where such connections have failed, with the result that one section of the bolt-work could not be moved, and a lockout was thereby caused. To obviate this danger, therefore, and at the same time retain the ordinary connections between the different sections of the bolt-work, we provide an additional and separate connection directly between the operating power and each separate section of the bolt-work, so that even if one section should become disconnected from the other it would still be in operative connection with the bolt-operating power, whether spindle, springs, or other power.

In the accompanying drawings.

In describing the drawings I will first describe the tripping device and then the bolt-work connections.

Referring to the letters on the drawings, A indicates the case of an automatic bolt-operating device, which in the drawings is shown as double.

B indicates one of the crank-shafts thereof, and C the other, each being provided with holes for the reception of the pins of a double lever-handle, by which they may be simultaneously operated in a well-known manner. These crank-shafts are in operative connection with the internal mechanism of the bolt-operating devices, which, being of well-known construction, are not herein described in detail. These crank-shafts are provided, respectively, with hooks E and F, each of which is adapted to engage with corresponding hooks I² upon the adjacent ends of the first levers I, and the hook E is provided on top at its end with a projection G.

H indicates studs projecting from the side of the case, to each of which is pivoted one of the first levers I of the compound levers, whose second levers K are pivoted to similar studs L. The second levers K are provided with slots M, within which play the studs N of the first levers I. They are also provided on their free ends with inwardly-projecting pins O, and are secured to the pivot-studs by screws P and washers Q, the studs being internally screw-threaded to receive the screws.

The above-named parts, with the exception of the projection G, are well known in the art, and are described for the purpose of better illustrating the relations of our invention in operation.

R indicates a bar which extends from one to the other of the studs H, and whose ends form washers between the first levers I and the screws S, which are screwed into internal screw-threads in the studs.

Figure 1:
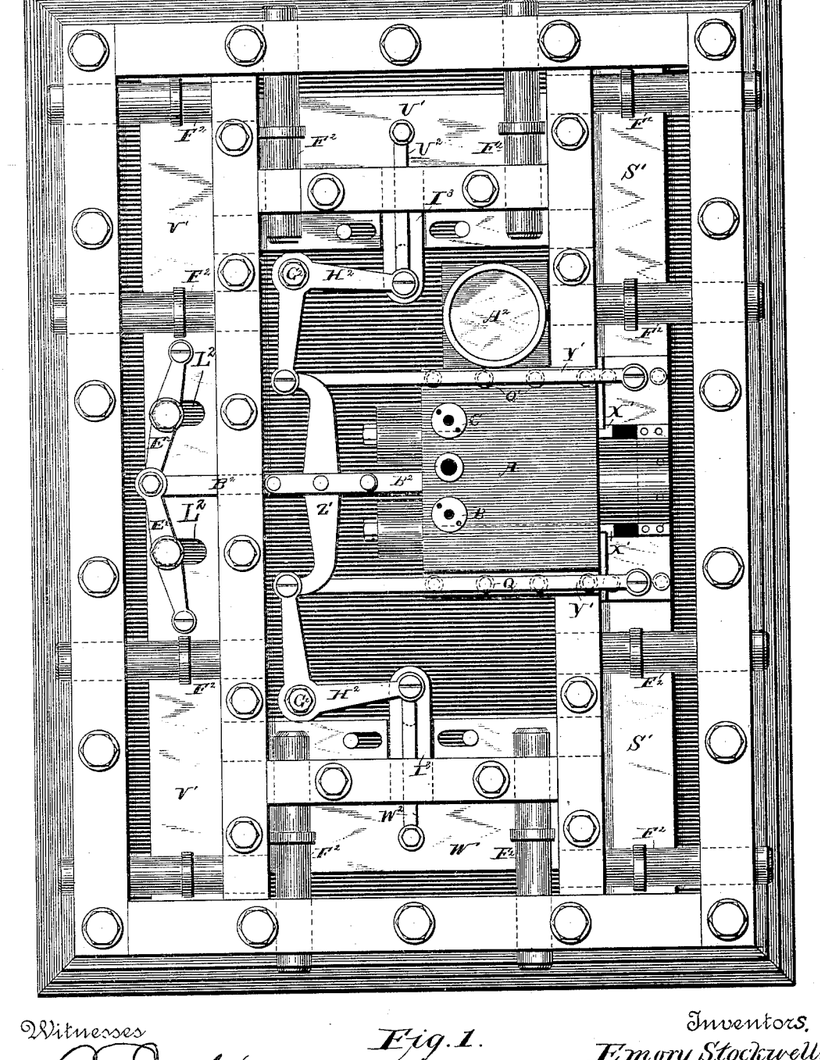
Figure 1 is an elevation of the interior of a safe or vault door with our invention applied, showing the bolts in the retracted position.
Figure 2:
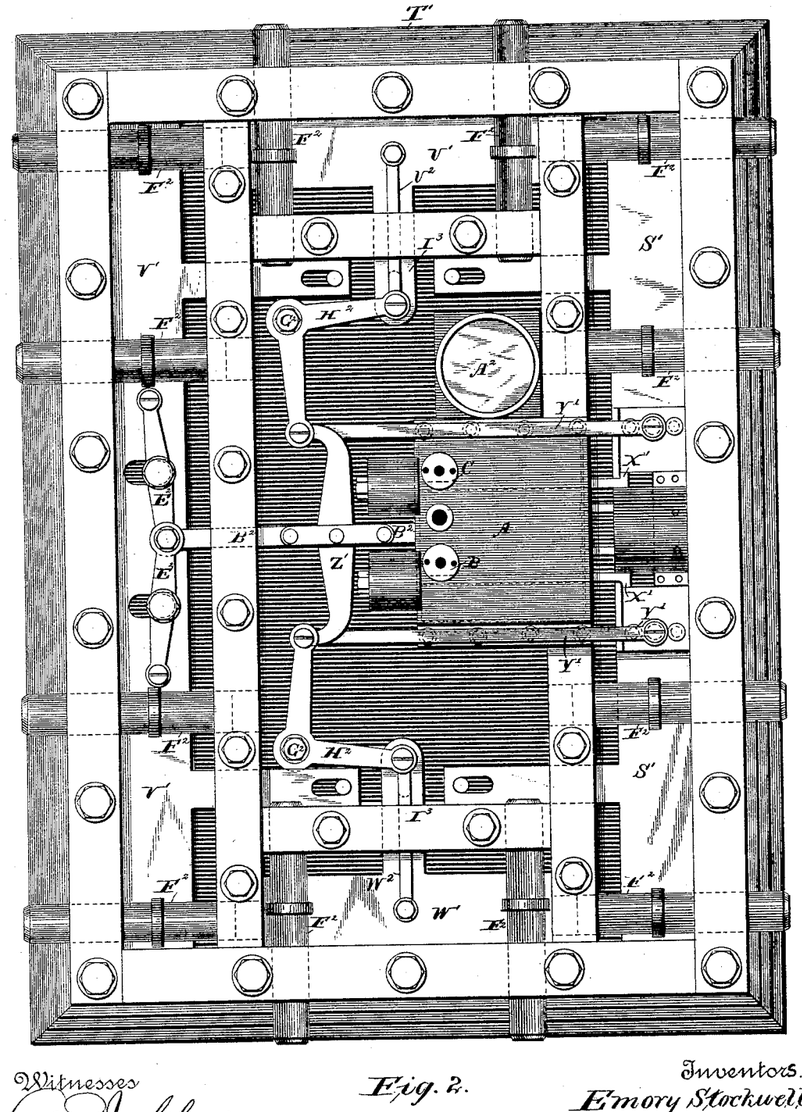
Fig. 2 is a similar view showing the bolts in the cast position.
Figure 3:
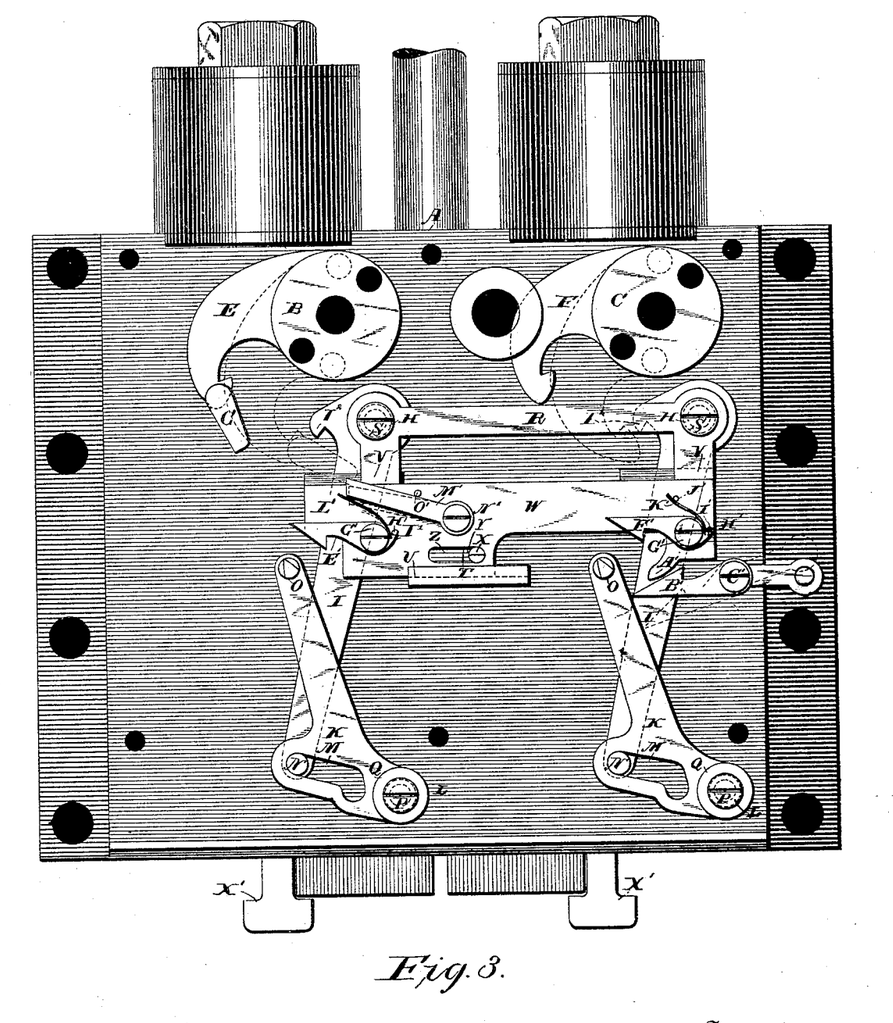
Fig. 3 is a view of our tripping device applied to a bolt-operating case with the cap removed and the sliding plate in the unset position.

T indicates a projection secured to the case integrally or otherwise and provided on one side with a channel U, within which and under the rabbeted projecting ends V of the bar R slides loosely the plate or carrier W. This plate is of such weight and so loosely fitted that in the usual position of the bolt-operating device shown in the drawings it tends to drop downward. Its motion is controlled by any suitable means—such, for instance, as a screw-stud X, screwing into a projection Y, (which may, if convenient, form a part of the projection T,) and playing within the vertical slot Z in the plate. Upon its upper end the plate carries a hook A', that is adapted to engage with a catch B', that is pivotally secured by a screw C' to a stud D', which projects from the case. The opposite end of this catch projects outside of the case and is adapted to be tripped at a predetermined time by suitable time mechanism A², Fig. 2.

E' F' indicate latches upon opposite ends of the plate W, to which they are pivoted by means of screws G', screwing into screw-threaded holes in the top of the plate.

H' indicates pins extending from the plate W in the path of the tails I' of the latches E' F', respectively, to limit their rotation in one direction.

J' indicates another projecting pin, against which the free end of the spring K', that it secured at its opposite end to the top of the latch F', bears.

L' indicates a spring secured to the top of the latch E'. It bears at its free end against the movable arm M', that is pivoted to the top of the plate upon the screw N', and which limits the expansion of the spring by means of the pin O', against which it bears.

P' indicates a cap or cover adapted to be secured to the case by means of screws Q'.

Figure 4:
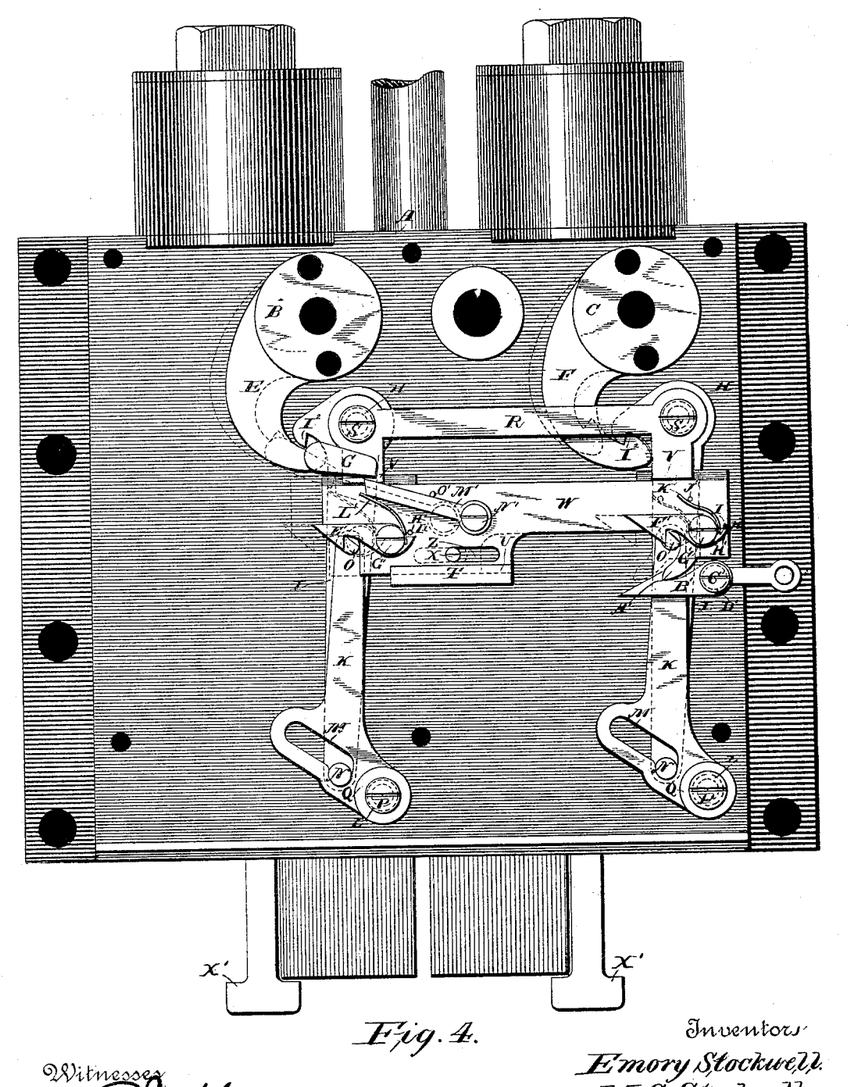
Fig. 4 is a similar view showing the sliding plate in the set position.

The operation of our tripping device is as follows: When the pins of the lever-handle have been placed in the holes in the head of the crank-shafts and the handle moved in the right direction, it will first cause the projection G of the hook E to impinge against the movable pawl M', and through it lift the plate W into position, so that its point A' will engage with the hook B'. The continued movement of the handle will then cause the ends of the hooks E and F to impinge against the first lever I of the compound levers, which will throw the second lever K into engagement with the hooks E' and F'. The mechanism will then be in the position shown in Fig. 4 of the drawings. As soon as the catch B' is thrown out of the path of the hook A' by any means, which in use would be the time mechanism, the plate W is released and falls, thereby instantly releasing the second levers K, and thus releasing the springs to retract the bolt-work.

It should be observed that the pawl M' is made movable in order that the projection G of the hook F in dropping will not jam against the end of the pawl, as it would if the pawl were fixed.

Coming now to that part of our invention which relates to improvements in connections of the bolt-operating device with the bolt-work, S' indicates the bolt-carrying bar on the front edge of a safe-door T', for instance, and U', V', and W' the other carrying-bars. The ordinary connections with the front carrying-bar are the draw-bars X', which in the accompanying drawings are shown as double, because the double automatic mechanism is therein illustrated. In addition to these we provide the two connecting-bars Y', which are each secured at one end to the carrying-bar S' and at the other end to opposite ends of the yoke Z'. To this yoke is secured the bar B², which passes through an opening in the rear of the case A and is operated by the rear of the spring-carriages C². It is evident, therefore, that if either one or both of the draw-bars X' should break, the full force of the springs would still be exerted on the carrying-bar through the connecting-rods $y'$ to retract the bolt-work.

For operating the remaining sections of the bolt-work we prolong the bar B² back of the yoke Z' and pivotally unite its end to the ends of levers E², that are centrally pivoted through the slots L² in the bar V' to the door, and at their opposite ends are pivoted to the carrying-bar. F² indicates the fastening-bolts. The upper and lower sections are operated through bell-crank levers H². These consist of two independent bell-crank levers pivoted at G², one directly in front of the other. Those in the rear connect, respectively, with the carrying-bars U' W' and those in the front connect with the links V² and W², which are in turn connected to the carrying-bars U' and W'. The opposite ends of the rear levers H² are connected to the rear of the yoke Z', while those in front are connected to the front of the yoke. It will thus be seen that there is provided a double connection for the four sections of the bolt-work with the bolt-operating device, so that in case of breakage or failure of one connection there is always a second one ready to operate the bolts.

It is clear from the foregoing description that our improved devices reduce the chances of any breakage to a minimum and by the duplication of parts makes it practically impossible for any lockout to occur in consequence of such breakage.

A further advantage of our construction, especially with regard to double automatic bolt-operating devices, is that in the case of the failure of one side to operate all twisting strains are avoided.

Figure 5:
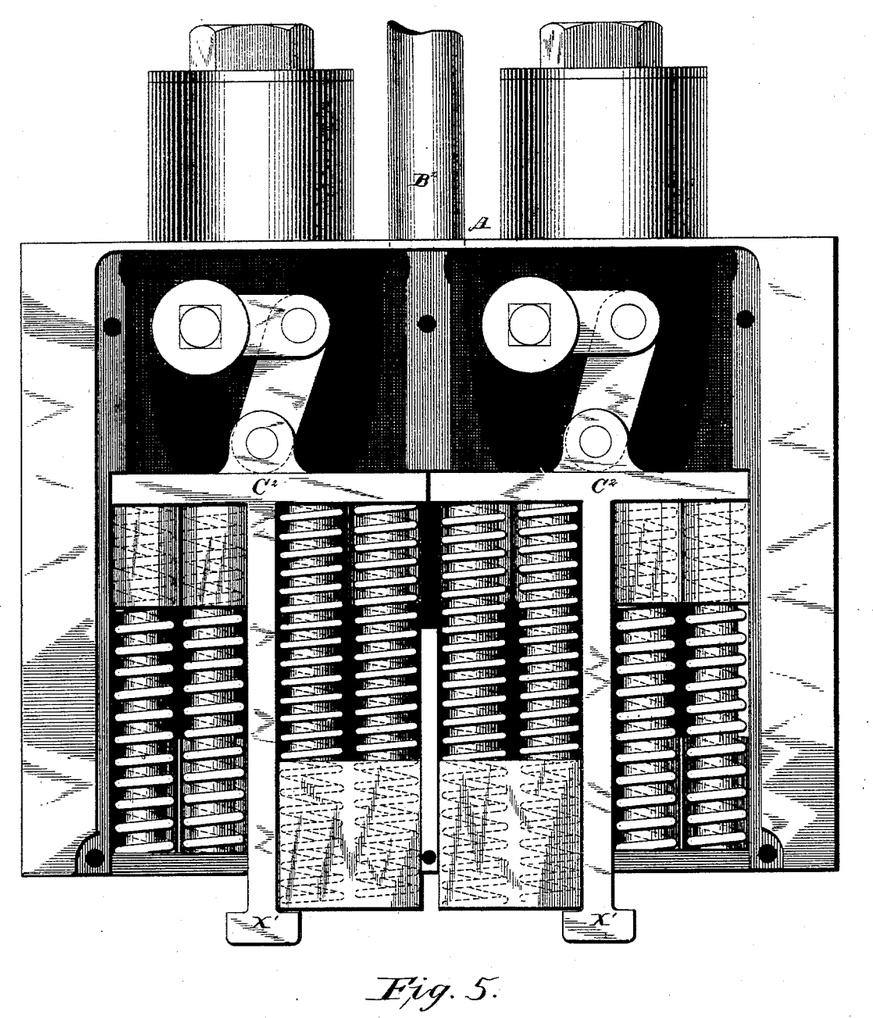
Fig. 5 is a view in elevation of the interior mechanism of the double bolt-operating device.
Figures 6, 7, 8, 9, 10:
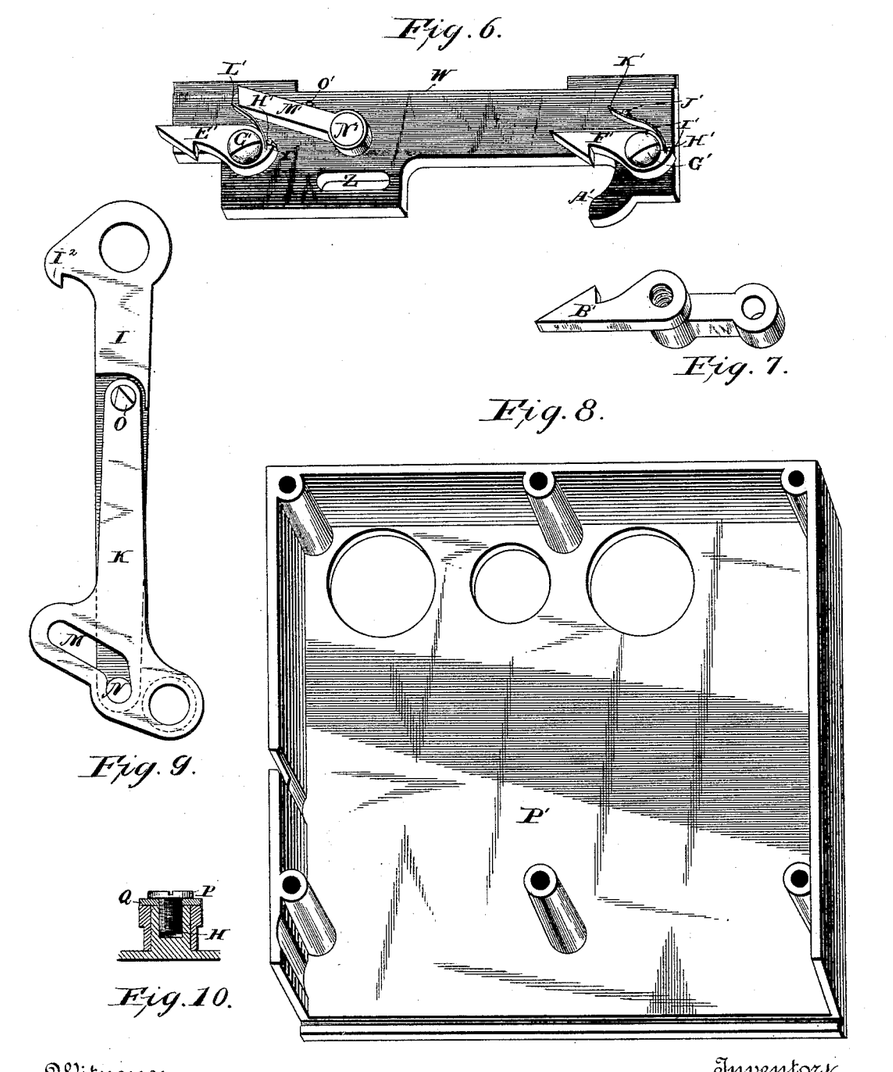
Fig. 6 is a view of the sliding plate and connected parts detached.
Figs. 7 and 9 are detail views of detached parts of the tripping device.
Fig. 8 is an interior perspective view of the cap detached.
Fig. 10 is a sectional view of a stud and revolving part secured thereto, intended to illustrate in one figure the studs H, L, and D', which, being similarly formed, carry in a similar manner the parts I, K, and C'. One figure is therefore deemed sufficient to illustrate all.
Figure 11:
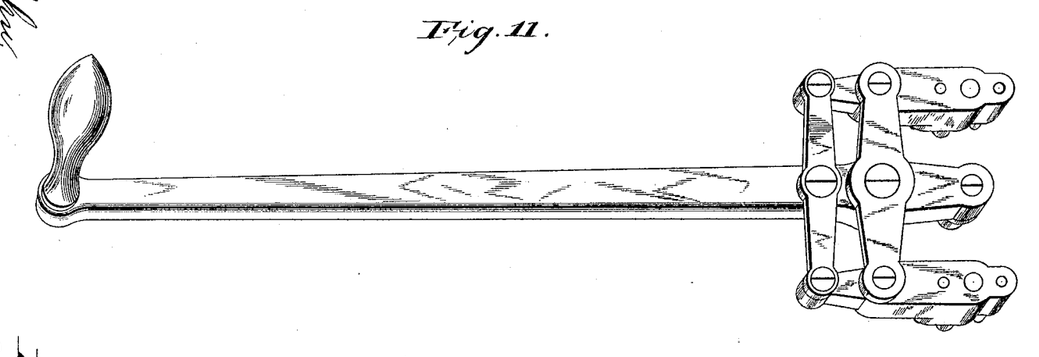
Fig. 11 is a perspective view of the double lever-handle for setting the bolt-operating mechanism.
Figure 12:
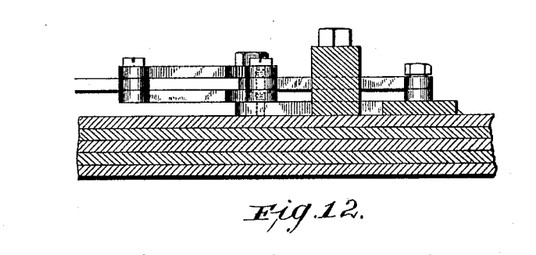
Fig. 12 is a sectional view through a part of the safe or vault door, showing a side elevation of the double bell-crank-lever connections H² in place.
Figure 13:
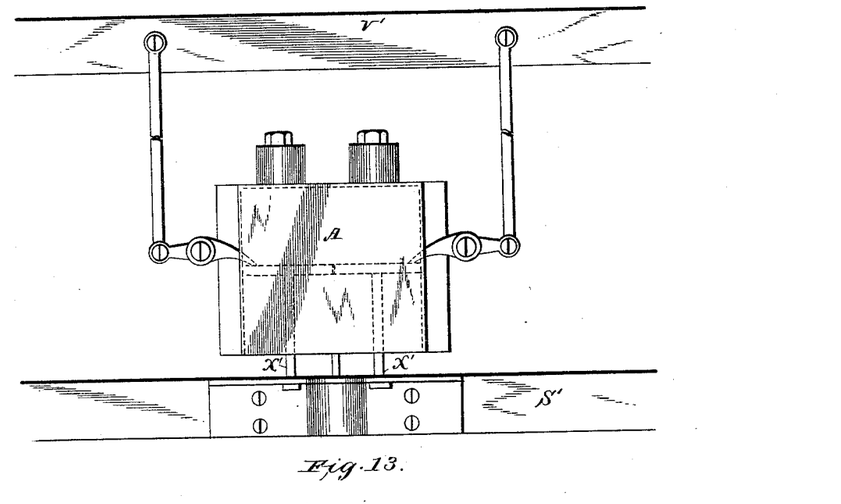
Fig. 13 is a detail view showing a modified form of connection between the bolt-work and bolt-operating mechanism, in which the connection is made with the spring-carriages through the sides of the case instead of through the end. In this form the connection with the rear draw-bar is made through pivoted levers.
Figure 14:
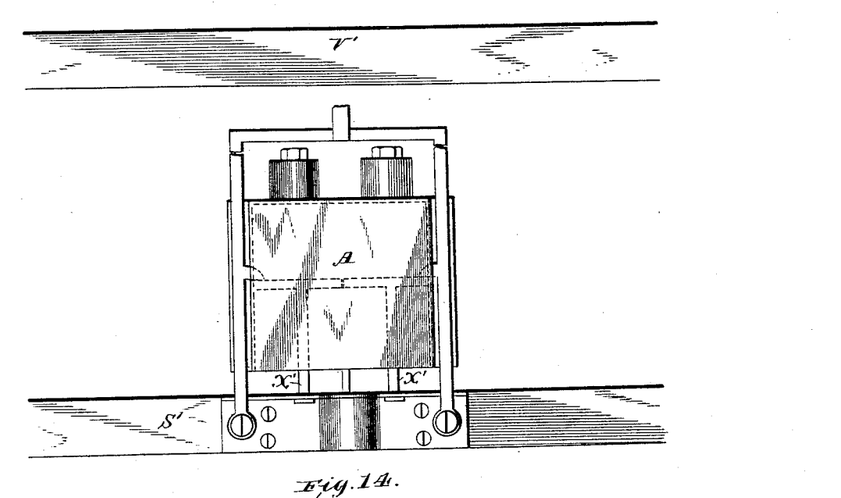
Fig. 14 is a similar view of another modification, showing the connection made directly without the intervention of pivoted levers, also showing the double connection in front and the yoke in the rear.

In the double device there are provided in practice usually eight springs for unlocking—viz., four on a side, but only two springs on a side for locking. These latter are made lighter than the others, so that in case of the failure of the locking-springs on one side to operate there is always ample power in the unlocking-springs of the other side to overcome their force and retract the bolts. But with this construction the unlocking-springs have tended more or less to produce a twisting strain on the bolt-work, because the retracting power was applied in one direction and on one side of the center, while the resistance to said retraction was all on the other side of the center. This strain added more or less friction and difficulty in the retraction of the bolt-work. By our improved construction such twisting strain is obviated by means of the bar B², which is actuated by the rear of the spring-carriages, as shown clearly in Fig. 5. The bar B² is also connected to the yoke Z', whose ends are connected to rods Y', which are in turn connected to the carrying-bar S' on each side of the bolt-operating mechanism. With this arrangement, if one side of the retracting power fails, the power of the other side will be so distributed by means of the yoke Z' and the rods Y' on either side of the retracting power that practically all twisting strain will be avoided and the motion of the bolt-work will be parallel and without unnecessary friction. In the case of the single bolt-operating device this same construction would be available, not for avoiding twisting strains, but for making double connection with the draw-bar, so that in case of the breakage of the front or ordinary connection the connection through the yoke and rods would still remain and retract the bolt-work.

To gain the object of our invention it is not essential that the supplementary rods which connect the spring-carriages to the carrying-bar should be attached to a yoke in the rear; but the yoke may be attached in any desired manner to the spring-carriages, and there may be supplemental connections in addition to the ordinary draw-bars made to the spring-carriages at the sides or any other convenient points, the necessary point being to make attachments to the carrying-bar on both sides of the center of the automatic bolt-operating mechanism, so that the power of each carriage will through such connections be transmitted in such a way as to avoid a twisting strain on the bolt-work, and in the case of the single automatic mechanism to provide for the supplemental connections between the spring-carriages and the carrying-bar.

What we claim is—

1. In a double or multiple bolt-operating device, the combination of a time-lock, bolt-work, and bolt-operating powers, the tripping mechanism consisting of a sliding plate or carrier, and holding mechanism which operatively connects the plate with the series of bolt-operating powers, so that when said plate is released by the time-lock all the operating powers are thereby simultaneously released, substantially as set forth.

2. In a bolt-operating device, a crank or power shaft provided with a hook and with a projection upon the hook adapted to engage and operate with movable tripping and holding mechanism, substantially as set forth.

3. In tripping mechanism for a bolt-operating device, a crank or power shaft provided with a hook and a projection, combined with a compound lever, a sliding carrier, and a catch for supporting it, substantially as set forth.

4. In a double or multiple bolt-operating device, the combination of a double or multiple wrench with a series of crank or power shafts adapted to be turned simultaneously by the wrench for setting up the operating powers, each of said shafts being provided with a hook and one of them being provided with a lifting projection, a carrier which is lifted by said projection, a catch which supports it when lifted, compound levers with which the hooks of the power-shafts engage upon continued rotation, and hooks upon the carrier, with which the compound levers engage, so that all of said powers may be simultaneously placed and held in the locked position through said mechanism until released by time mechanism, substantially as set forth.

5. In a double bolt-operating device, a carrier provided with hooks, each of which is adapted to engage with the supporting mechanism of operating powers, and a single catch for supporting the carrier in the elevated position, which catch is adapted to be released by a time-lock, substantially as set forth.

6. In a bolt-operating device, the combination of a crank or power shaft having a hook and a projection with a sliding carrier and a movable arm, with which said projection engages for setting said carrier, said arm being adapted to yield and move out of the way, so as to oppose no material resistance to the operation of the power-shaft when the unlocking movement takes place, substantially as set forth.

7. The combination, in a bolt-operating device, of the carrying-bar of the bolt-work, a draw-bar connecting the carrying-bar with the power-shaft in the usual manner, and a secondary connection in the rear of the operating power by means of a bar and a yoke, and connecting-bars for operatively connecting said yoke and the carrying-bar, whereby in case of failure of either bar connection the other would be operative, substantially as set forth.

8. The combination, with the carrying-bar, of a bolt-operating power connected with said bar by the usual draw-bar and also by a separate connection with the rear of said draw-bar, substantially as set forth.

9. In a double bolt-operating device, the combination of a yoke and connecting-bars connected with the yoke, spring-carriages, spring power, and a carrying-bar, whereby in case of the failure of one of the unlocking mechanisms the power of the other is transmitted to the carrying-bar at points on both sides of the center of the bolt-operating power to avoid twisting strain, substantially as set forth.

10. The combination, with bolt-work adapted to fasten different edges of a door, of a bolt-operating power, a front carrying-bar and two independent connections with said carrying-bar extending to the rear of the power, and mechanism connecting them with each one of the sections of bolt-work, whereby if one of said connections should fail to operate the other would operate all of the bolts, substantially as set forth.

11. The combination, with a bolt-operating power and a carrying-bar, of a yoke at the rear of said power and arms connecting said yoke and carrying-bar, substantially as and for the purposes described.

12. The combination of a bolt-operating power with a carrying-bar and separate independent connecting pieces between the two, substantially as set forth.

13. The combination, with bolt-work adapted to fasten different edges of a door, of a bolt-operating power and a double set of direct connections between the power and each separate section of the bolt-work, substantially as set forth.

14. A bolt-operating mechanism provided with a series of connections with the same carrying-bar, one of said connections being the usual draw-bar and another engaging with the rear or sides of the spring-carriage, substantially as set forth.

In testimony of all which we have hereunto subscribed our names.

EMORY STOCKWELL.
HERBERT C. STOCKWELL.

Witnesses:
SCHUYLER MERRITT,
GEO. E. WHITE.